United States Patent
Kfir et al.

(10) Patent No.: US 10,757,230 B2
(45) Date of Patent: Aug. 25, 2020

(54) EFFICIENT PARSING OF EXTENDED PACKET HEADERS

(71) Applicant: Mellanox Technologies TLV Ltd., Raanana (IL)

(72) Inventors: Aviv Kfir, Nili (IL); Barak Gafni, Campbell, CA (US); Avner Hadash, Kfar Saba (IL); Ortal Ben Moshe, Givat Shmuel (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 9 days.

(21) Appl. No.: 15/836,986

(22) Filed: Dec. 11, 2017

(65) Prior Publication Data

US 2019/0182366 A1 Jun. 13, 2019

(51) Int. Cl.
*H04L 29/06* (2006.01)

(52) U.S. Cl.
CPC ................... *H04L 69/22* (2013.01)

(58) Field of Classification Search
None
See application file for complete search history.

(56) References Cited

U.S. PATENT DOCUMENTS

| | | |
|---|---|---|
| 5,394,394 A | 2/1995 | Crowther et al. |
| 6,308,219 B1 | 10/2001 | Hughes |
| 6,356,951 B1 * | 3/2002 | Gentry, Jr. ............ H04L 69/22 709/217 |
| 6,788,680 B1 | 9/2004 | Perlman et al. |
| 2003/0043848 A1 | 3/2003 | Sonksen |
| 2004/0081101 A1 | 4/2004 | Bennett |
| 2004/0088430 A1 | 5/2004 | Busi et al. |
| 2005/0089016 A1 | 4/2005 | Zhang et al. |
| 2007/0276952 A1 | 11/2007 | Mitchell |
| 2008/0025308 A1 * | 1/2008 | Morgan ................ H04L 69/16 370/392 |
| 2008/0095149 A1 | 4/2008 | Dai |

(Continued)

OTHER PUBLICATIONS

Gibb et al., "Design Principles for Packet Parsers", ACM/IEEE Symposium on Architectures for Networking and Communications Systems (ANCS), 12 pages, Oct. 2013.

(Continued)

*Primary Examiner* — Jeffrey M Rutkowski
*Assistant Examiner* — Basil Ma
(74) *Attorney, Agent, or Firm* — Kligler & Associates Patent Attorneys Ltd

(57) ABSTRACT

Communication apparatus includes multiple interfaces configured to be connected to a network so as to receive and transmit data packets having respective packet headers, which can include sub-headers of different, respective types. A memory stores instructions for parsing each type of sub-headers and a transition table, which indicates, for each of the types, a location of the instructions for parsing a subsequent sub-header depending upon the type of the subsequent sub-header. A plurality of predefined types are represented in the transition table by a common alias. Routing logic parses the first sub-header in a packet, reads the type of the second sub-header from the first sub-header, and accesses the transition table using the common alias in place of the type of the first sub-header so as to locate and read the instructions for parsing the second sub-header.

13 Claims, 3 Drawing Sheets

(56) References Cited

U.S. PATENT DOCUMENTS

| | | | |
|---|---|---|---|
| 2013/0215906 A1 | 8/2013 | Hidai | |
| 2015/0081726 A1* | 3/2015 | Izenberg | H04L 47/2433 707/755 |
| 2015/0172189 A1* | 6/2015 | Pitchai | H04L 69/22 370/392 |
| 2015/0256456 A1 | 9/2015 | Previdi et al. | |
| 2015/0341265 A1* | 11/2015 | Basso | H04L 45/74 370/392 |
| 2016/0139892 A1* | 5/2016 | Atreya | G06F 8/71 717/143 |
| 2016/0197852 A1 | 7/2016 | Hutchison et al. | |
| 2017/0064047 A1* | 3/2017 | Bosshart | H04L 69/22 |

OTHER PUBLICATIONS

Deering et al., "Internet Protocol, Version 6 (IPv6) Specification", Request for Comments: 2460, 39 pages, Dec. 1998.
Kfir et al., U.S. Appl. No. 15/866,585, filed Jan. 10, 2018.
University of Southern California, "Darpa Internet Program", Protocol Specification, RFC 791, 50 pages, Sep. 1981.
U.S. Appl. No. 15/866,585 office action dated Mar. 28, 2019.
U.S. Appl. No. 15/866,585 office action dated Sep. 17, 2019.

* cited by examiner

EFFICIENT PARSING OF EXTENDED PACKET HEADERS

FIELD OF THE INVENTION

The present invention relates generally to packet communication networks, and particularly to apparatus and methods for routing packets in such networks.

BACKGROUND

In a packet communication network, routers receive packets through one of a set of input interfaces and forward them on through one of a set of output interfaces. Routing decisions are made on the basis of information in the packet header, which typically includes the destination address and source address of the packet, along with other information, such as the destination and source device ports, transport protocol, packet length, and priority. The form and contents of the packet header and the manner in which routing decision are made based on the packet header are specified by the network-layer protocol that is used in the network. The most common network-layer protocol is the Internet Protocol (IP), and in particular IP Version 4 (IPv4).

IP Version 6 (IPv6) is a network-layer protocol for packet-switched internetworking, which provides end-to-end datagram transmission across multiple IP networks. IPv6 follows the design principles developed in IPv4 but includes additional features that require more sophisticated handling by routers. IPv6 is formally defined in Internet Engineering Task Force (IETF) Request for Comments (RFC) 2460, published in December, 1998.

IPv6 specifies a header format that includes a mandatory basic header and multiple optional extension headers. The basic header (sometimes referred to as the "fixed header") occupies the first 40 octets (320 bits) of the IPv6 packet and contains the source and destination addresses, traffic classification options, a hop counter, and the type of the extension header or payload that follows the header. The extension headers carry options that are used for special treatment of a packet in the network, for example for purposes of routing control, fragmentation, and security protocols. The IPv6 header (including any extension headers) is most commonly followed by a transport-layer protocol header and payload data, for example under the Transmission Control Protocol (TCP) or User Datagram Protocol (UDP). Alternatively, the IPv6 header can be followed by headers and payloads in accordance with other sorts of protocols, such as the Internet Control Message Protocol (ICMP). The headers following the IP basic header and extension headers are referred to generically as "upper-layer" headers.

The IPv6 header and each of the extension headers contains a "Next Header" field, which identifies the type of header that follows and thus links the headers together in a chain. The Next Header field in the basic header indicates the type of the first extension header. The Next Header field of the last extension header indicates the type of the upper-layer protocol header, for example the transport-layer protocol header. The Next Header fields in the intermediate extension headers each point to the next one in the chain. The number of extension headers may vary from packet to packet, and the sizes of the extension headers may vary (though all are required to be a multiple of eight octets).

SUMMARY

Embodiments of the present invention that are described hereinbelow provide improved methods and apparatus for routing data packets that contain extension headers.

There is therefore provided, in accordance with an embodiment of the invention, communication apparatus, including multiple interfaces configured to be connected to a network so as to receive and transmit data packets having respective packet headers. At least some of the data packets have a packet header that includes at least first and second sub-headers of different, respective types selected from among a set of predefined types, and the first sub-header contains a field defining a type of the second sub-header. A memory is configured to store instructions for parsing each of the predefined types of sub-headers and to store a transition table, which indicates, for each of the predefined types, a location of the instructions for parsing a subsequent sub-header depending upon the type of the subsequent sub-header. A plurality of the predefined types are represented in the transition table by a common alias.

Routing logic in the apparatus is configured, upon receiving the at least some of the data packets, to parse the first sub-header, to read the type of the second sub-header from the first sub-header, to access the transition table using the common alias in place of the type of the first sub-header so as to locate and read the instructions for parsing the second sub-header, to parse the second sub-header using the instructions, and to process and forward the data packets via the interfaces to the network based on information extracted from the parsed sub-headers.

In some embodiments, the instructions indicate, for each of the predefined types, a respective alias to be used in accessing the transition table, while indicating the common alias for all of the predefined types within the plurality. Typically, the packet header in the at least some of the data packets includes at least a third sub-header, and the routing logic is configured to read the type of the third sub-header from the second sub-header, and to access the transition table using the common alias in place of the type of the second sub-header so as to locate and read the instructions for parsing the third sub-header.

In a disclosed embodiment, the packet header that includes the at least first and second sub-headers is an Internet Protocol Version 6 (IPv6) header, and the sub-headers are selected from a group that consists of an IPv6 basic header and one or more IPv6 extension headers.

In some embodiments, the sub-headers further include a length field, and the routing logic is configured to extract a value of the length field from the first sub-header and to apply the extracted value in locating the second sub-header. In a disclosed embodiment, the instructions for each of the predefined types include a respective length computation function, and the routing logic is configured to compute a length of the first sub-header by applying the respective length computation function to the value of the length field, and jump to a start of the second sub-header using the computed length.

There is also provided, in accordance with an embodiment of the invention, a method for communication, which includes receiving from a network data packets having respective packet headers. At least some of the data packets have a packet header that includes at least first and second sub-headers of different, respective types selected from among a set of predefined types, and the first sub-header contains a field defining a type of the second sub-header. Instructions are stored for parsing each of the predefined types of sub-headers, as well as a transition table, which indicates, for each of the predefined types, a location of the instructions for parsing a subsequent sub-header depending upon the type of the subsequent sub-header. A plurality of the predefined types are represented in the transition table by a common alias.

The method includes, upon receiving the at least some of the data packets, parsing the first sub-header and reading the type of the second sub-header from the first sub-header, and accessing the transition table using the common alias in place of the type of the first sub-header so as to locate and read the instructions for parsing the second sub-header. The second sub-header is parsed using the instructions, and the data packets are forwarded to the network based on information extracted from the parsed sub-headers.

The present invention will be more fully understood from the following detailed description of the embodiments thereof, taken together with the drawings in which:

DETAILED DESCRIPTION OF EMBODIMENTS

Overview

Figure 1:
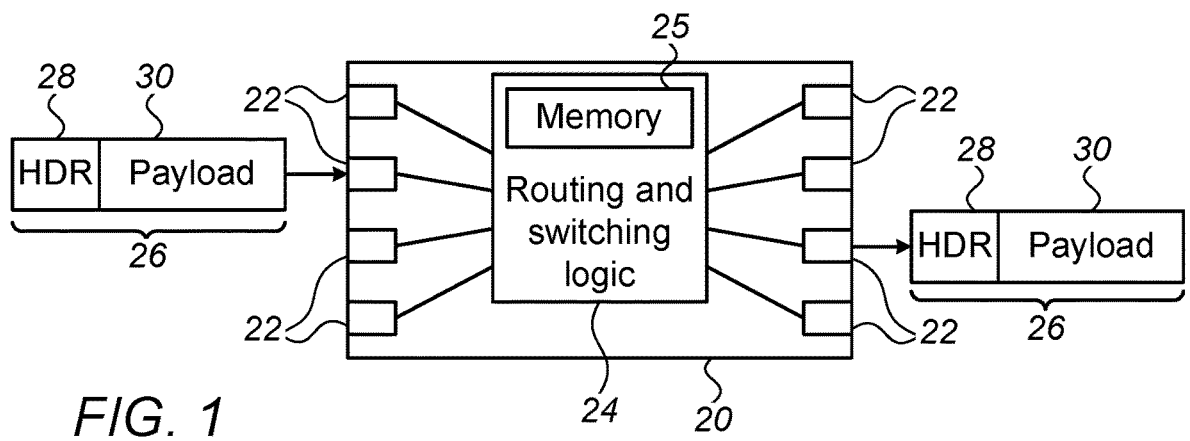
FIG. 1 is a block diagram that schematically illustrates a router, in accordance with an embodiment of the invention.

In modern packet communication networks, the packet header typically comprises multiple sub-headers. In IP networks, for example, the header portion of the packet begins with a medium access control (MAC) header, also referred to as a Layer 2 header. The MAC header is followed by the IP header, also referred to as the network-layer header or Layer 3 header. The IP header is generally followed by an upper-layer header, such as a transport-layer header (also referred to as a Layer 4 header) or control protocol header. As noted earlier, when IPv6 is used, the IP header comprises a basic header and, optionally, one or more extension headers. For the sake of clarity in the description that follows and in the claims, each of the component parts of the packet header, such as the MAC header, IP headers (including basic and extension headers), and upper-layer headers, is referred to as a sub-header, while the term "packet header" is used to refer to all of these sub-headers taken together, i.e., all of the information in the packet that precedes the data payload.

As a first step in deciding how to forward a given packet, the router generally parses the packet header, i.e., identifies the fields in the various sub-headers that contain relevant information and extracts the information from these fields that is to be used by the routing logic. Parsing is inherently sequential: Each sub-header is identified by the preceding sub-header, requiring the router to identify and parse the sub-headers in sequence. Therefore, the parsing process is commonly modeled and implemented as a parse graph, with nodes corresponding to the sub-header types and directional edges (also known as arcs) connecting the node for each sub-header type to the nodes that may follow it. The graph is stored by the router and, for each packet that the router receives from the network, the nodes and edges are traversed by parsing logic in the router along a path that depends on the sequence of types of the sub-headers.

In some protocols, however, the size and complexity of the parsing graph can become unmanageable. For example, in IPv6, the basic header can be followed by any of a number of different extension headers and upper-layer headers, and each of the extension headers can likewise be followed by other extension headers, as well as upper-layer headers. When the basic header and each of the extension headers is represented by its own node, the parse graph can grow to includes dozens of edges, and the parsing logic bears the burden of recognizing and handling all of them.

Embodiments of the present invention that are described herein alleviate this problem through the use of aliases, each of which can represent a group of multiple different types of sub-headers. This approach assumes that the instructions for parsing the next sub-header will be the same for all members of the group in question. For example, the IPv6 basic header and IPv6 extension headers can all be referred to by a common alias, which is then used in looking up parsing instructions for the next sub-header. This use of aliases simplifies the parse graph and reduces the amount of memory and the logical complexity required for parsing of such packets.

In the disclosed embodiments, communication apparatus, such as a router, receives and transmits data packets from and to a network via multiple interfaces. As explained earlier, at least some of the data packets received by the router have a packet header that includes multiple different types of sub-headers, and each sub-header (at least among the Layer 2 and Layer 3 sub-headers) contains a field defining the type of the next sub-header. Routing logic in the router includes a parser, which parses the packet headers using instructions for each type of sub-header.

These instructions are typically stored in a memory of the router along with a transition table, which indicates the location of the instructions for parsing the next sub-header. (The term "memory" is used broadly in this context to mean any sort of chip-level circuits that are capable of storing this sort of data, including, without limitation, read/write memory, read-only memory, and instructions that are coded in a gate array.) Each transition in the transition table is keyed according to a name identifying the type of the current sub-header and the value of the next header field in the current sub-header, which identifies the type of the next sub-header. The name of the current sub-header that is used for this purpose, however, can be an alias; and for a certain group of the sub-header types—for example, the IPv6 basic header and extension headers—the same, common alias can represent all of the sub-header types in the group.

Thus, upon receiving a data packet from the network, the routing logic parses a first sub-header in the packet, reads the next header field from this first sub-header, and then accesses the transition table to find instructions for parsing the next sub-header. These instructions typically indicate the properties of the sub-header in question, for example the locations of certain data fields within the sub-header. The routing logic looks up instructions for parsing the third and subsequent sub-headers in the same fashion. For sub-header types in the group that are represented by the common alias, the routing logic uses this alias in place of the actual type name of the current sub-header in locating the instructions for parsing the next sub-header. The router thus processes and forwards the data packet to the network via the appropriate egress interface based on information extracted in this manner from the parsed sub-headers.

In the embodiments that are described hereinbelow, the group of sub-headers that share a common alias is assumed to comprise the IPv6 basic header and any extension headers. Alternatively, the principles of the present invention may be applied, mutatis mutandis, in processing of packets transmitted in accordance with other protocols, particularly protocols that allow flexibility in composition of the sub-headers in the packet header. Furthermore, although the disclosed embodiments relate specifically to routers, the principles of the present invention may similarly be applied to other sorts of communication apparatus that process and forward packets in accordance with Layer 3 protocols (and possibly higher protocol layers), such as switches, gateways, and network interface controllers.

System Description

FIG. 1 is a block diagram that schematically illustrates a router 20, in accordance with an embodiment of the invention. Router 20 comprises multiple interfaces 22, which are connected to a network (not shown), such as an IP network. Interfaces 22 comprise, for example, ports comprising suitable physical layer (PHY) and MAC interfaces, as are known in the art, for receiving and transmitting data packets 26 from and to the network. Interfaces 22 are typically bidirectional, both receiving and transmitting packets; but alternatively, some or all of the interfaces may be configured exclusively as ingress interfaces or egress interfaces. Each incoming packet 26 has a respective packet header 28, followed by a payload 30. As explained earlier, packet header 28 typically comprises multiple sub-headers, which are illustrated in FIG. 2.

Routing and switching logic 24 parses and processes headers 28 of received packets 26, using instructions and information stored in a memory 25. (Although memory 25 is shown in FIG. 1, for the sake of conceptual clarity, as a distinct block within routing and switching logic 24, in practice this memory may be integrated locally with the routing and switching circuits.) Based on these instructions and the information extracted from the parsed headers, routing and switching logic 24 processes and forwards the data packets via the appropriate interfaces 22 to the network. At least some of the sub-headers are typically updated or otherwise modified by routing and switching logic 24 in order to generated headers 28 of the transmitted packets 26.

Typically, routing and switching logic 24 comprises digital logic circuits, which may be hard-wired or programmable and are configured to carry out the functions that are described herein, along with other routing and switching functions that are known in the art. Additionally or alternatively, routing and switching logic may comprise a processor, such as an embedded microprocessor, which is programmed in software to carry out at least some of these functions. Router 20 typically comprises a single integrated circuit chip, for example an application-specific integrated circuit (ASIC), comprising interfaces 22, logic 24 and memory 25. Alternatively, router 20 may be implemented in a set of two or more chips that carry out these functions.

Figure 2:
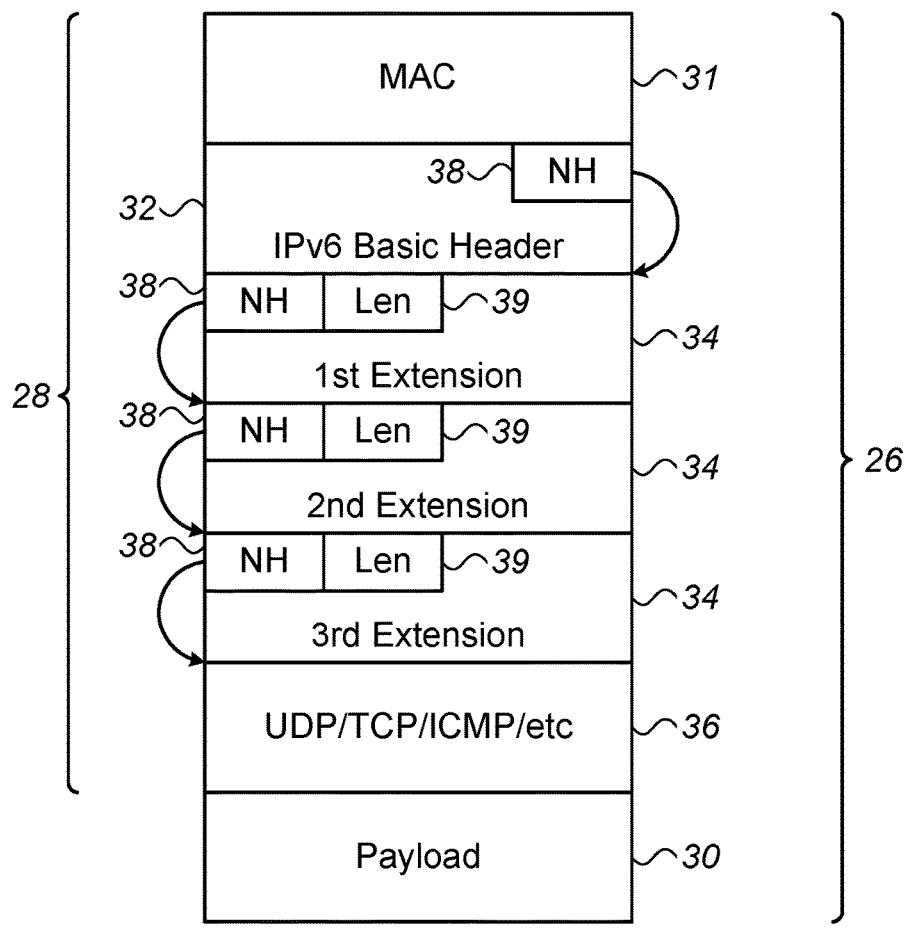
FIG. 2 is a block diagram that schematically illustrates the structure of an IPv6 packet, which is parsed in accordance with an embodiment of the invention.

FIG. 2 is a block diagram that schematically illustrates the structure of packet 26, in this case an IPv6 packet, which is parsed and processed by router 20 in accordance with an embodiment of the invention. Packet header 28 includes multiple sub-headers 31, 32, 34, 36 of different, respective types, from among a set of predefined types that router 20 is programmed to handle. Specifically, the sub-headers in packet header 28 begin with a MAC header 31, followed by an IP header comprising an IPv6 basic header 32 and (in this example) three extension headers 34, and then an upper-layer header 36. Within the IPv6 header, each sub-header 32, 34 contains a next-header (NH) field 38, which defines the type of the next sub-header. Each of sub-headers 34 also comprises a length (Len) field 39, which is used by routing and switching logic 24 in locating the next sub-header, as explained further hereinbelow with reference to FIG. 5.

Figure 3:
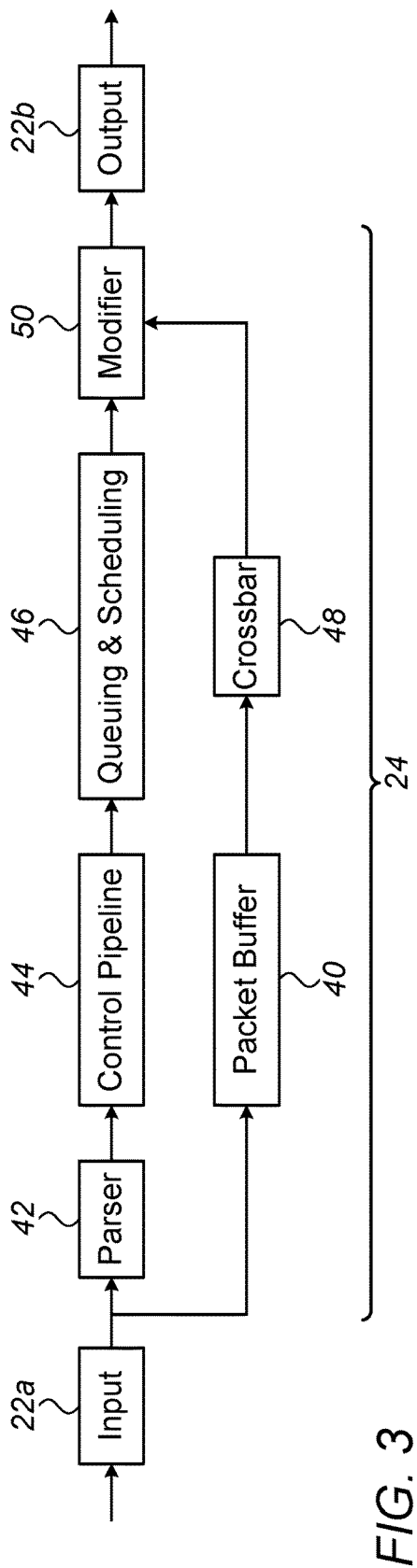
FIG. 3 is a block diagram that schematically illustrates routing and switching logic, in accordance with an embodiment of the invention.

FIG. 3 is a block diagram that schematically shows details of routing and switching logic 24, in accordance with an embodiment of the invention. This figures shows the elements of logic 24 in the order in which they typically operate on a packet 26 that is received through an input (or ingress) interface 22a, until the packet is transmitted out to the network through an output (or egress) interface 22b. This particular functional organization is shown here by way of example, to illustrate particularly the role of a parser 42 in parsing packet headers. Alternative implementations will be apparent to those skilled in the art after reading the present description and are considered to be within the scope of the present invention.

Payloads 30 of incoming packets 26 (and possibly headers 28, as well) are stored in a packet buffer 40 while awaiting processing of packet headers 28. Meanwhile, parser 42 parses each of sub-headers 31, 32, 34, 36 in turn, accesses instructions stored in memory 25 for processing the information in each of the sub-headers, and thus extracts relevant data fields from the sub-headers. Parser 42 passes the parsing results to a control pipeline 44, which uses this information in deciding how each packet should be handled. Specifically, control pipeline 44 selects output interface 22b (or interfaces) through which each packet is to be forwarded, as well as setting control parameters, such as transmission priority, and deciding on changes to be made in outgoing packet headers 32.

Queuing and scheduling logic 46 queues each packet 26 for transmission through the chosen output interface 22b. When a packet reaches the head of its queue, a crossbar switch 48 transfers the packet data to a packet modifier 50, which updates the fields in header 32 in accordance with the instructions prepared by control pipeline 44. The packet is then transmitted to the network through output interface 22b.

Header Parsing Operations

Figure 4:
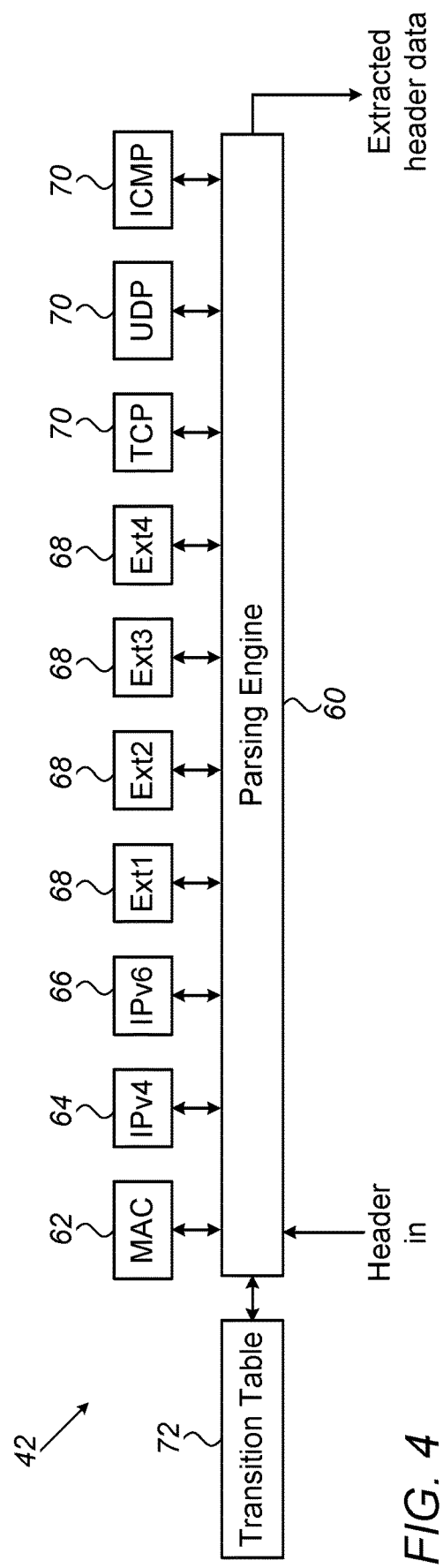
FIG. 4 is a block diagram that schematically shows details of a packet parser, in accordance with an embodiment of the invention.

FIG. 4 is a block diagram that schematically shows details of packet parser 42, in accordance with an embodiment of the invention. Packet parser 42 comprises a parsing engine 60, comprising digital logic configured to locate and read out the data values of relevant fields in each of sub-headers 31, 32, 34, 36, and to pass the extracted header data to control pipeline 44. For this purpose, parsing engine uses instructions for parsing each type of sub-header, which are stored in respective configuration files 62, 64, 66, 68, 70 in memory 25.

In the pictured example, these configuration files include a MAC configuration file 62, an IPv4 configuration file 64 (not used in the present example), an IPv6 basic header configuration file 66, IP extension header configuration files 68, and upper-layer protocol configuration files 70. Each configuration file contains, inter alia, the following information:

The offset (relative to the start of the sub-header) of next header field 38 within this type of sub-header. For example, in IPv6 basic header 32, the offset of next header field 38 is six bytes, while in extension headers 34 the offset is zero.

The offset of length field 39 within this type of sub-header, for example one byte in extension headers 34.

A mathematical function to be applied to the value of length field 39 in order to compute the actual length (typically in bytes) for this type of sub-header. For example, in IPv6 basic header 32 the function simply has the constant value forty, since the IPv6 basic header is always forty bytes long. In extension headers 34, the function is "sub-header length=8+(8×header_length)," wherein header_length is the value of length field 39.

An alias name to be used in accessing a transition table 72 in memory 25, as explained below. For IPv6 basic header 32 and the various possible extension headers 34, configuration files 66, 68 all contain the same, common alias—which is set arbitrarily to the value "IPv6E" in the example transition table shown below.

As noted earlier, transition table 72 indicates, for each of the predefined sub-header types, the location of the instructions for parsing the next sub-header, depending upon the types of the current sub-header and the next sub-header. In an example embodiment, transition table 72 has the form shown in Table I below:

TABLE I

EXAMPLE TRANSITION TABLE

| Name of current sub-header | Value of next header field | Location (name) of next configuration file |
| --- | --- | --- |
| MAC | 0x0800 | IPv4 |
| MAC | 0x86DD | IPv6 |
| . . . other transitions . . . | | |
| IPv6E | 0 | Ext1 |
| IPv6E | 43 | Ext2 |
| IPv6E | 139 | Ext3 |
| IPv6E | 140 | Ext4 |
| IPv6E | 6 | TCP |
| IPv6E | 17 | UDP |
| IPv6E | 58 | ICMP |
| . . . | . . . | . . . |

As illustrated by the above table, regardless of which IPv6 sub-header is currently be processed (basic header 32 or any one of extension headers 34), parsing engine 60 will access transition table 72 using the same common alias, IPv6E. As noted earlier, this approach simplifies the parse graph and thus enables the use of a much smaller transition table than would be required if the actual sub-header names were used for lookup.

After parsing packet header 26 using the information in configuration files 62, 64, 66, 68 and 70, as appropriate, and in transition table 72, parsing engine extracts and outputs the relevant header information to control pipeline 44. This information typically includes the offsets of all extracted sub-headers within packet header 26, along with the values of relevant fields to be used by control pipeline 44 in processing and routing the packet, such as source and destination addresses, source and destination ports, and so forth, in accordance with applicable protocol and network requirements.

Figure 5:
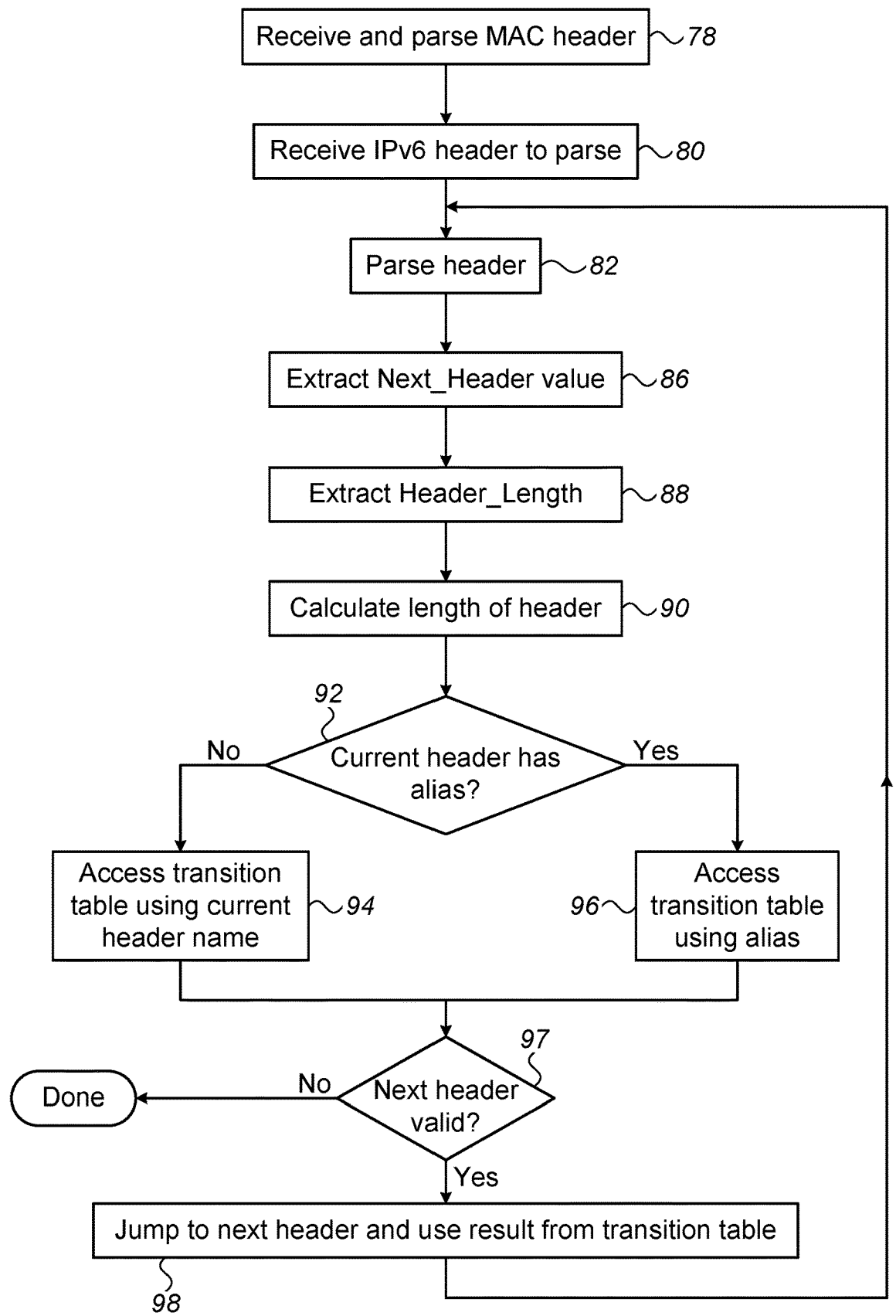
FIG. 5 is a flow chart, which schematically illustrates a method for parsing data packets, in accordance with an embodiment of the invention.

FIG. 5 is a flow chart, which schematically illustrates a method for parsing data packets, in accordance with an embodiment of the invention. The method is described, for the sake of clarity and concreteness, with reference to the components of parser 42 that are shown in FIG. 4. Alternatively, the principles of this method may be applied in other parsing configurations, as will be apparent to those skilled in the art after reading the present description.

The method begins at the point at which parsing engine 60 receives and parses MAC header 31, at a MAC parsing step 78. Parsing engine 60 then reaches the IPv6 part of packet header 26, at an IPv6 header input step 80, for example following MAC header 31 in the transition shown in the second row of the transition table 72 that is illustrated in Table I above. Initially, parsing engine 60 parses IPv6 basic header 32, at a parsing step 82. For this purpose, parsing engine 60 uses the instructions provided by configuration file 66. Based on these instructions, parsing engine 60 identifies and outputs the offsets and values of relevant fields in IPv6 basic header 32, for use by control pipeline 44.

For each sub-header that it processes, parsing engine 60 reads next header field 38, at a next header processing step 86. Parsing engine 60 reads out the value of the next header field (such as the values illustrated in the middle column of Table I, for example).

Parsing engine 60 also extracts the value of length field 39 from the current sub-header, at a length extraction step 88 (other than from IPv6 basic header 32, for which the length is fixed and known in advance). Parsing engine 60 will apply this length value in locating the start of the next sub-header 34 or 36. For this purpose, parsing engine 60 also reads the appropriate length computation function from the configuration file of the current sub-header, for example configuration file 66 for IPv6 basic header 32, or the respective configuration file 68 for any of extension headers 34. Parsing engine 60 applies this length computation function to the value of length field 39 that it extracted at step 88 in order to compute the actual length of the current sub-header, at a length calculation step 90.

Parsing engine 60 checks the alias of the current sub-header in configuration file 66 or 68, at an alias checking step 92. If no alias is present, parsing engine 60 can access transition table 72, using the actual name of the current sub-header and the next header value extracted at step 86 as keys to the table, at a name access step 94. If an alias is found, parsing engine 60 uses the alias and the next header value as the keys to transition table 72, at an alias access step 96. In either case, the corresponding row in transition table 72 will indicate the configuration file 68 or 70 that should be accessed in order to read the instructions for parsing the next sub-header 34 or 36.

Parsing engine 60 checks whether the next header name that it has read from transition table 72 is valid, at a validity checking step 97. If not, parsing engine 60 concludes that it has reached the end of the header—for example, because the current sub-header is upper-layer header 36—and thus can move on to parsing the header of the next packet.

Otherwise, parsing engine 60 jumps to the start of the next sub-header using the length computed at step 90, at a next header access step 98. Parsing engine 60 returns to step 82 and parses the next header using the configuration file identified at step 94 or 96. Thus, the parsing engine extracts and outputs the appropriate field values and offsets from this next header, as described above, and then goes on to identify and locate the following header (if any) at step 86. This sequential process continues until all sub-headers have been processed.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:

multiple interfaces configured to be connected to a network so as to receive and transmit data packets having respective packet headers, wherein at least some of the data packets have a packet header that includes at least first and second sub-headers of different, respective types selected from among a set of predefined types, and the first sub-header contains a field defining a type of the second sub-header;

a memory configured to store:
configuration files each including instructions for parsing a respective one of the predefined types of sub-headers, wherein at least some of the configuration files include an alias name of a group of a plurality of types to which the type of the configuration file belongs, and a transition table of entries, in which each entry correlates between a pair of a current sub-header type and a subsequent sub-header type and a corresponding location of one of the configuration files which includes instructions for parsing a sub-header corresponding to the entry, wherein the current sub-header type of at least some of the entries in the transition table identify a group of a plurality of different predefined types by a single common alias, such that the single common alias refers to a plurality of different predefined types; and routing logic, which is configured, upon receiving a packet of the at least some of the data packets, to parse the first sub-header of the received packet, to read the type of the second sub-header from the first sub-header, to retrieve the single common alias of the group of types to which the first sub-header belongs from the configuration file corresponding to the type of the first sub-header, to access the transition table using the retrieved single common alias and the type of the second sub-header so as to locate and read the instructions in the configuration file for parsing the second sub-header, to parse the second sub-header using the instructions, and to process and forward the data packets via the interfaces to the network based on information extracted from the parsed sub-headers.

2. The apparatus according to claim 1, wherein the instructions indicate, for each of the predefined types, a respective alias to be used in accessing the transition table, while indicating the common alias for all of the predefined types within the plurality.

3. The apparatus according to claim 1, wherein the packet header in the at least some of the data packets includes at least a third sub-header, and wherein the routing logic is configured to read the type of the third sub-header from the second sub-header, and to access the transition table using the common alias in place of the type of the second sub-header so as to locate and read the instructions for parsing the third sub-header.

4. The apparatus according to claim 1, wherein the packet header that includes the at least first and second sub-headers is an Internet Protocol Version 6 (IPv6) header, and wherein the sub-headers are selected from a group that consists of an IPv6 basic header and one or more IPv6 extension headers.

5. The apparatus according to claim 1, wherein the sub-headers further comprise a length field, and wherein the routing logic is configured to extract a value of the length field from the first sub-header and to apply the extracted value in locating the second sub-header.

6. The apparatus according to claim 5, wherein the instructions for each of the predefined types include a respective length computation function, and wherein the routing logic is configured to compute a length of the first sub-header by applying the respective length computation function to the value of the length field, and jump to a start of the second sub-header using the computed length.

7. A method for communication, comprising:

receiving from a network data packets having respective packet headers, wherein at least some of the data packets have a packet header that includes at least first and second sub-headers of different, respective types selected from among a set of predefined types, and the first sub-header contains a field defining a type of the second sub-header;

storing configuration files each including instructions for parsing a respective one of the predefined types of sub-headers, wherein at least some of the configuration files include an alias name of a group of a plurality of types to which the type of the configuration file belongs;

storing a transition table including entries, in which each entry correlates between a pair of a current sub-header type and a subsequent sub-header type and a corresponding location of one of the configuration files which includes instructions for parsing a sub-header corresponding to the entry, wherein the current sub-header type of at least some of the entries in the transition table identify a group of a plurality of different predefined types by a single common alias, such that the single common alias refers to a plurality of different predefined types; and upon receiving a packet of the at least some of the data packets:
parsing the first sub-header of the received packet and reading the type of the second sub-header from the first sub-header;

retrieving the single common alias of the group of types to which the first sub-header belongs from the configuration file corresponding to the type of the first sub-header;

accessing the transition table using the retrieved single common alias and the type of the second sub-header so as to locate and read the instructions in the configuration file for parsing the second sub-header;

parsing the second sub-header using the instructions; and forwarding the data packets to the network based on information extracted from the parsed sub-headers.

8. The method according to claim 7, wherein the instructions indicate, for each of the predefined types, a respective alias to be used in accessing the transition table, while indicating the common alias for all of the predefined types within the plurality.

9. The method according to claim 7, wherein the packet header in the at least some of the data packets includes at least a third sub-header, and wherein the method comprises reading the type of the third sub-header from the second sub-header, and accessing the transition table using the common alias in place of the type of the second sub-header so as to locate and read the instructions for parsing the third sub-header.

10. The method according to claim 7, wherein the packet header that includes the at least first and second sub-headers is an Internet Protocol Version 6 (IPv6) header, and wherein the sub-headers are selected from a group that consists of an IPv6 basic header and one or more IPv6 extension headers.

11. The method according to claim 7, wherein the sub-headers further comprise a length field, and wherein parsing the first sub-header comprises extracting a value of the length field from the first sub-header, and parsing the second sub-header comprises applying the extracted value in locating the second sub-header.

12. The method according to claim 11, wherein the instructions for each of the predefined types include a respective length computation function, and wherein locating the second sub-header comprises computing a length of the first sub-header by applying the respective length computation function to the value of the length field, and jumping to a start of the second sub-header using the computed length.

13. The apparatus according to claim 1, wherein the routing logic is configured to check for each sub-header whether the corresponding configuration file includes an alias, and if the configuration file does not include an alias, to access the transition table using the type of the first sub-header and the type of the second sub-header.

* * * * *